Aug. 28, 1951  D. J. HEIKENS  2,565,815
CORN HARVESTER ADJUSTING MEANS
Filed April 12, 1949  2 Sheets-Sheet 1
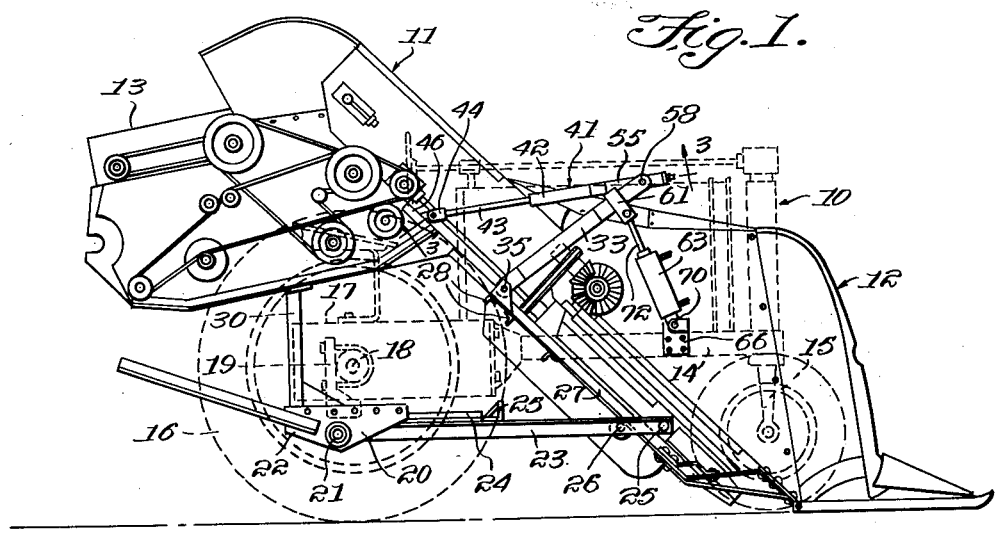
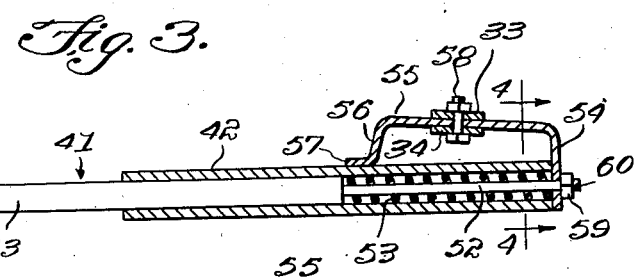
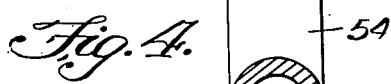
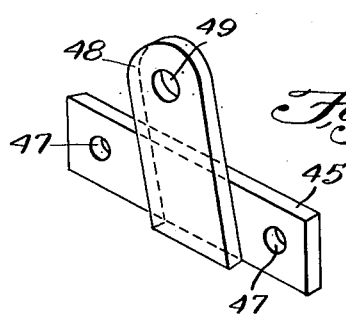
INVENTOR.
Dale J. Heikens,
BY Victor J. Evans & Co.
ATTORNEYS

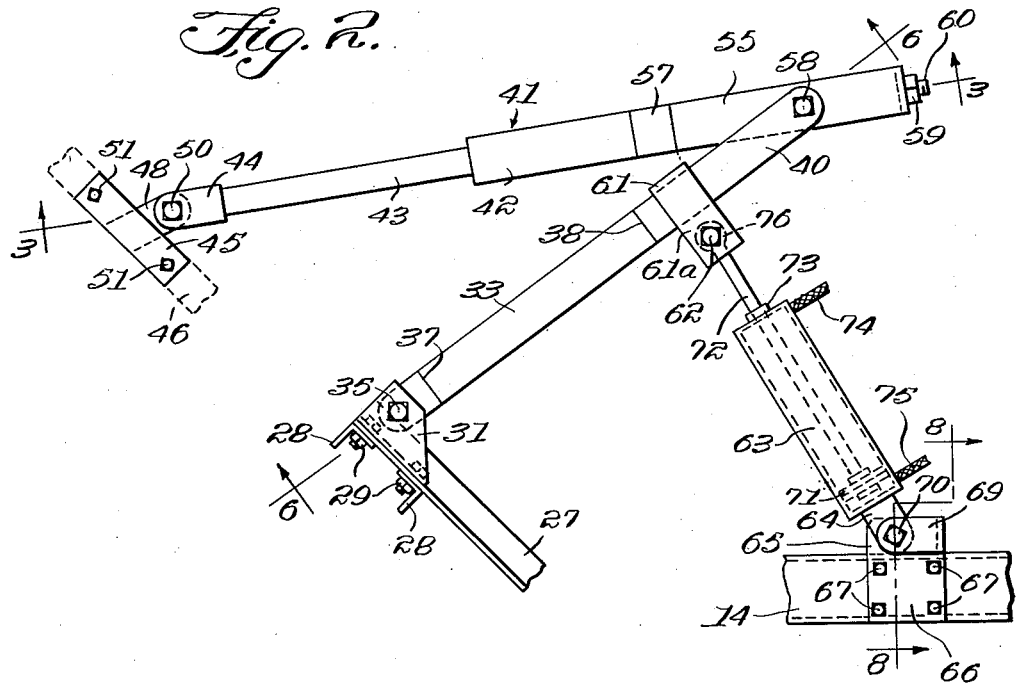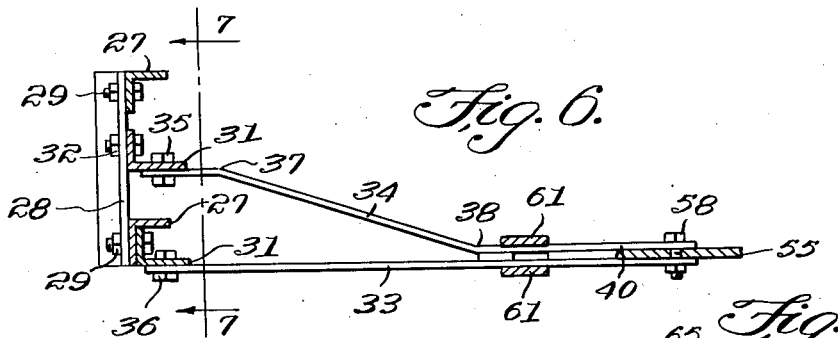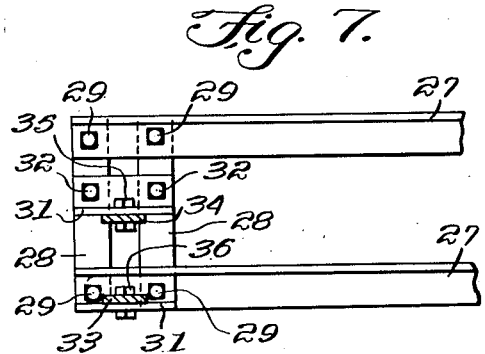

Patented Aug. 28, 1951

2,565,815

UNITED STATES PATENT OFFICE 2,565,815

CORN HARVESTER ADJUSTING MEANS

Dale J. Heikens, Everly, Iowa

Application April 12, 1949, Serial No. 86,909

3 Claims. (Cl. 56—18)

The present invention relates to improvements in harvesting machines, and in particular to a pressure fluid mechanism for raising and lowering the picker of the harvester at the end of the plant rows.

Briefly, the invention consists in providing a corn harvester of the type shown in the Benjamin M. Hyman et al. Patent No. 2,255,168, September 9, 1941, with fluid pressure operated linkage for raising and lowering the picker of the harvesting mechanism to thus eliminate manual operating labor and in addition to save excessive wear on the corn harvesting machine by cushioning the same against heavy shocks and violent vibrations.

One object of the invention is to provide a device of the above-mentioned type which can be easily controlled from a position adjacent the driver's seat of the tractor when the end of a plant row is reached to elevate the picker of the harvester, and thus enable the harvester to be turned more readily and rapidly and hence facilitate the manipulation thereof over various sloping terrain and ground surfaces.

Another object of the invention is to provide a device of the above-mentioned type which is adapted to be readily applied to a corn harvesting machine, and which may be easily affixed to the frame of the picker and to the chassis of the tractor without altering the construction of the harvester mechanism and the tractor frame structure.

Another object is to provide a pressure fluid control mechanism which includes a pair of pivoted link members, one of which is provided with yielding spring means to absorb shocks during operation of the corn picker or harvester, and in addition to permit raising of the harvester picker.

Another object is to provide a pressure fluid lifting mechanism for a corn harvesting and husking machine as described in the aforesaid patent, which is positive in operation and can be conveniently installed between the picking mechanism at each side of the tractor.

Other objects and advantages of the invention may become apparent during the course of the following description of the accompanying drawings, wherein:

Figure 1 is a side elevational view of the invention illustrating the manner in which the same is applied to the left hand side of a tractor for controlling and lifting the harvesting mechanism, including the picker and husker of a corn harvester on the corresponding side of the tractor.

Figure 2 is an enlarged side elevational view of the invention illustrating in detail the manner in which the control links are pivotally connected to the picker frame, and the manner in which the pressure fluid cylinder is rockably mounted on the chassis frame.

Figure 3 is a longitudinal cross-sectional view taken on line 3—3 of Figure 2 looking in the direction of the arrows and illustrating in detail the construction of the spring loaded link for absorbing shocks and vibrations imparted to the harvesting mechanism.

Figure 4 is an enlarged transverse cross-sectional view taken on line 4—4 of Figure 3 and looking in the direction of the arrows to illustrate details of construction of the bracket on said spring loaded plunger.

Figure 5 is an enlarged perspective view of one of the brackets for attaching the plunger of the shock absorber to the corn harvesting picker frame so that a push force exerted thereon by the pressure fluid device will urge the harvester mechanism in a direction to lift the front end thereof.

Figure 6 is a longitudinal cross-sectional view taken on the oblique line 6—6 of Figure 2 and looking in the direction of the arrows to illustrate various structural details of another pivoted link likewise connected to the picker frame of the harvester, and pivotally attached to the shock absorbing link at its upper end.

Figure 7 is a transverse cross-sectional view taken on line 7—7 of Figure 6 and looking in the direction of the arrows to illustrate the manner in which one of the pivoted link members of the operating mechanism is pivotally connected to the frame members of the picker, and Figure 8 is a vertical cross-sectional view taken on the zig-zag line 8—8 of Figure 2 looking in the direction of the arrows to illustrate the supporting plate upon which the operating cylinder is rockably mounted.

In the drawings, and more in detail, attention is directed to Figure 1 wherein for the purpose of convenience of illustration there is shown a three wheeled tractor generally designated 10 and a corn harvesting mechanism generally designated 11 which includes a picker structure likewise generally designated 12, and a husker generally designated 13. The tractor 10 includes a chassis frame 14, the front end of which is supported by a single steering wheel structure 15, while the rear wheels 16 support the rear portion of the tractor and are spaced a considerable distance from the gear casing frame structure 17. The corn harvesting mechanism 11 is of the same general type shown in the Hyman et al. patent and is adapted to be mounted between the combined gear casing and the wheels 16 at each side of the tractor, and while the invention is intended to be applied to each harvester mechanism on both sides of the tractor, a description of one mechanism will suffice for both.

The corn harvester 11 is supported to swing vertically from a position below the rear axle 18 of the tractor, and as shown in Figure 1 a bracket arm 19 is clamped to the axle and has its lower end formed to provide a foot to which is bolted the frame structure 20 of the supporting mechanism. The frame structure 20 includes a pipe or tubular member 21 to which is affixed adjacent its ends pairs of plates 22 to which the corn picker frame structure is attached. The arrangement being such that the corn harvester 11 may swing vertically about a horizontal axis below the rear axle of the tractor 18.

Connected to the side plates 20 and extending forwardly therefrom is an angle bar 23, and in addition an angle bar 24 parallel with said bar 23 extends for a portion of its length forwardly as at 24 and is connected to the angle bar 23 by means of a transverse angle bar 25. The forward end of the angle bar 23 is attached to the frame structure of the harvester 11 by means of a pivot pin 25, and an extension projecting from the transverse angle bar 25 is likewise connected to the frame structure of the harvester as at 26. The harvester frame structure includes an oblique channel member 27 on each side of the gathering mechanism (not shown), and as illustrated in Fig. 7, the upper ends of the angle bars of the channel frame structure are connected by spaced angle bars 28 bolted in place at their ends as at 29. The frame structure including the angle bars 27 are further braced and are adapted to support the picker mechanism of the harvester 11 which includes endless graspers for removing the corn from the stalks.

The husker 13 is also supported from the frame structure 20 by means of a vertical support 30 which extends from a position between the ends of the shaft 20 to a position as shown in Figure 1 to support the underside of the husker 13. The picker 12 and husker 13 are rigidly connected to swing vertically as a unit, and a conveyor is attached to the rear portion of the husker for loading the corn into a wagon (not shown).

Affixed to the transverse angle bars 28 is a pair of angle bars 31, one of which is fastened in place by bolts 32 while the other is held in place by the bolts 29 connecting the angle bars 27 and 28 (Figs. 6 and 7). Pivotally attached to the short angle bars 31 is a pair of links 33 and 34 which are held in place by pivot bolts 35 and 36 respectively. The link 34 is bent as at 37 and 38 to provide an oblique portion which converges toward the link 33 and extends parallel therewith for the remainder of its length as at 40.

The upper ends of the links 33 and 34 are adapted to be pivotally attached to a spring loaded strut generally designated 41 in a manner which will be hereinafter more fully described.

The spring loaded link 41 includes a cylinder 42 into which is telescoped a plunger 43, one end of which has affixed thereto a bifurcated fitting 44. A bracket plate 45 is bolted to the frame structure 46 of the husker 11 (Figs. 1 and 2) by means of bolts (not shown) being passed through openings 47, and said bracket plate has welded or otherwise affixed thereto a projection 48 having an opening 49 for receiving a pivot bolt 50 when the projection 48 is inserted between the furcations of the fitting 44 (Fig. 3). In assembling the structure to the husker frame 46 bolts 51 or other fastening members may be employed for detachably connecting the bracket plate 45 in place.

The inner end of the plunger rod 43 is reduced as at 52 and projects through the open end of the cylinder 42 as shown in Figure 3. A coil spring 53 encircles the reduced portion 52 of the plunger and has one end abutting the plunger and the opposite end in abutting relation with an extension 54 on a bracket 55. The extension 54 is welded or otherwise affixed to one end of the cylinder 42 and the bracket plate 55 is formed with an angular extension 56 having a foot portion 57 which is likewise welded or otherwise affixed to the cylinder 42. The bracket plate 55 extends oblique with respect to the axis of the shock absorber assembly 41 so that the free ends of the levers 33 and 34 may be pivotally connected thereto by means of a bolt and nut or other threaded fastener 58. The frame structures 27 and 46 of the picker and husker mechanism respectively are slightly offset and hence, the bracket plate 55 is slightly inclined so that compressional forces exerted on the cylinder 42 by the levers 33 and 34 will follow a straight line path.

The outer reduced end 52 of the plunger 43 is threaded as at 60 for receiving a correspondingly threaded stop nut 59. A U-shaped bracket 61 is passed over the pivoted links 33 and 34 adjacent their outer ends and are held in place by a combined clamping and pivot nut 62. A pressure fluid cylinder 63 is provided at one end with an ear 64 which is pivoted to an extension 65 on a bracket plate 66 which is secured to the chassis frame 14 by bolts or other fastening elements 67. Thus, the ear 64 may be bolted to the extension 65 and between a U-shaped extension 69 so as to be held therebetween by means of a bolt 70. A plunger 71 is reciprocably mounted in the cylinder 63 and is provided with a plunger rod 72 which projects through a gland packing 73 in one of the end walls of the cylinder 63 whereby pressure fluid admitted to opposite ends of the cylinder through conduits or ducts 74 and 75 will cause the piston 71 to move to and fro within said cylinder. The outer end of the plunger rod 72 is shaped to provide an eye 76 which is passed between the parallel plates 61a of the U-shaped bracket 61 so as to receive the combined clamping and pivot bolt 62.

The pipes or conduits 74 and 75 are connected to a suitable source of pressure fluid and a control valve is interposed between said source of pressure fluid and the conduits or pipes 74 and 75, so that pressure fluid may be admitted selectively to opposite ends of the cylinder 63.

In operation the control valve (not shown) is operated to admit pressure fluid to the lower end of the cylinder 63 when the harvester has reached the end of a plant row so as to tilt the harvester 11 vertically about the horizontal axis 21 and thus elevate the corn picker 12 to facilitate turning the harvester at the end of the plant row. In addition, the corn picker 12 is yieldingly supported by reason of the plunger structure 41 so that travel over uneven ground may be compensated for and the picker 12 may raise slightly while traveling over humps against the action of the yielding coil spring 53. In the normal position as shown in Figure 1 with the piston 71 retracted, the picker 12 may travel along the ground and remove the corn from the stalks in the conventional manner. Since the picker 12 and husker 13 are balanced pressure fluid may be admitted to opposite ends of the cylinder 63 by controlling the reversing valve to adjust said picker 12 with a high degree of precision and nicety of control.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

I claim:

1. In combination with a corn harvester mechanism including a picker and husker mounted on a tractor vehicle to swing about a horizontal pivot axis, a pair of link members connected to the frame structure of the picker, a pair of telescoped rods connecting the husker with the outer ends of said pair of links, a support on said tractor vehicle, a cylinder rockably mounted on said support, a piston and piston rod for said cylinder, means connecting the outer end of said piston rod with said pair of links, means for supplying pressure fluid to either end of said cylinder and yielding spring means between said telescoped rods for absorbing shocks imparted to said picker and husker mechanism.

2. In combination with a corn harvester mechanism including a picker and husker mounted on a tractor vehicle to swing about a horizontal pivot axis, a pair of link members connected to the frame structure of the picker, a pair of telescoped rods connecting the husker with the outer ends of said pair of links, a support on said tractor vehicle, a cylinder rockably mounted on said support, a piston and piston rod for said cylinder, means connecting the outer end of said piston rod with said pair of links, means for supplying pressure fluid to either end of said cylinder and yielding spring means between said telescoped rods for absorbing shocks imparted to said picker and husker mechanism, said piston rod being connected to the links adjacent their outer ends.

3. In combination with a corn harvester mechanism including a picker and husker mounted on a tractor vehicle to swing about a horizontal pivot axis, a pair of link members connected to the frame structure of the picker, a pair of telescoped rods connecting the husker with the outer ends of said pair of links, a support on said tractor vehicle, a cylinder rockably mounted on said support, a piston and piston rod for said cylinder, means connecting the outer end of said piston rod with said pair of links, means for supplying pressure fluid to either end of said cylinder and yielding spring means between said telescoped rods for absorbing shocks imparted to said picker and husker mechanism, said telescoped rods being pivoted to said links by a bracket carried by one of said rods having an inclined portion to insure pivotal movement about a straight line parallel with the frame structure of the picker and husker mechanism.

DALE J. HEIKENS.

REFERENCES CITED

The following references are of record in the file of this patent:

UNITED STATES PATENTS

| Number | Name | Date |
|---|---|---|
| 2,187,833 | Lock et al. | Jan. 23, 1940 |
| 2,348,634 | McEachern | May 9, 1944 |